US 6,733,622 B2

(12) United States Patent
McMahon et al.

(10) Patent No.: US 6,733,622 B2
(45) Date of Patent: May 11, 2004

(54) METHOD AND APPARATUS FOR ULTRASONICALLY STOMPING SLIDER END STOPS ON ZIPPER

(75) Inventors: Michael J. McMahon, Palatine, IL (US); Lawrence Share, Skokie, IL (US); Michael A. Pollack, Vernon Hills, IL (US); Donald L. Crevier, Essex, IL (US); Nigel D. Knight, Kankakee, IL (US); Stanley Piotrowski, Addison, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/113,489

(22) Filed: Apr. 1, 2002

(65) Prior Publication Data

US 2003/0183315 A1 Oct. 2, 2003

(51) Int. Cl.[7] ............................................... B29C 65/08
(52) U.S. Cl. .................. 156/580.2; 156/553; 156/580.1
(58) Field of Search ................................. 156/73.1, 290, 156/308.2, 308.4, 553, 580.1, 580.2; 264/442, 443, 445; 425/174.2

(56) References Cited

U.S. PATENT DOCUMENTS

| 4,403,465 A | * | 9/1983 | Bachner | 53/477 |
| 5,088,971 A | | 2/1992 | Herrington | 493/203 |
| 5,421,923 A | * | 6/1995 | Clarke et al. | 156/73.1 |
| 5,890,347 A | * | 4/1999 | Giacomelli et al. | 53/477 |
| 5,950,285 A | | 9/1999 | Porchia et al. | 24/400 |
| 5,976,315 A | * | 11/1999 | Martin | 156/580.2 |
| 6,036,796 A | | 3/2000 | Halbert et al. | 156/64 |
| 6,178,602 B1 | | 1/2001 | Burke et al. | 24/30.5 R |
| 6,287,001 B1 | | 9/2001 | Buchman | 383/64 |
| 6,309,487 B1 | * | 10/2001 | Herrin et al. | 156/73.1 |
| 6,357,914 B1 | | 3/2002 | Kinigakis et al. | 383/64 |

* cited by examiner

Primary Examiner—James Sells
(74) Attorney, Agent, or Firm—Ostrager Chong & Flaherty LLP

(57) ABSTRACT

An ultrasonic welding assembly comprising a horn, an anvil and an anvil cover. The horn comprises a generally T-shaped flattening surface and a rail projecting forward of the flattening surface. The rail is shaped to serve as a dam for flowing thermoplastic zipper material during stomping of slider end stops. The horn further comprises a plurality of vertical energy directors designed to direct ultrasonic energy into the mass of zipper material and deflect flowing zipper material toward the dam. The horn further comprises first and second recesses located on opposite sides of a stem of the T-shaped flattening surface. The anvil cover overlies opposing portions of the anvil and comprises a T-shaped cutout. The T-shaped flattening surface of the horn fits in the T-shaped cutout of the anvil cover. The resulting zipper has slider end stops located at opposing ends. Each end stop comprises flattened zipper material having a plurality of spaced indentations, the indentations being formed by the energy directors during stomping. The zipper can be preheated prior to ultrasonic stomping. A flange of the zipper can be cooled by fluid during ultrasonic stomping of the zipper parts.

25 Claims, 7 Drawing Sheets

METHOD AND APPARATUS FOR ULTRASONICALLY STOMPING SLIDER END STOPS ON ZIPPER

BACKGROUND OF THE INVENTION

This invention generally relates to slider-operated flexible zippers for use in reclosable pouches, bags or other packages of the type in which perishable material, such as foodstuff, may be stored.

Reclosable fastener assemblies are useful for sealing thermoplastic pouches or bags. Such fastener assemblies often include a plastic zipper and a slider. Typically, the plastic zippers include a pair of interlockable fastener elements, or profiles, that form a closure. As the slider moves across the profiles, the profiles are opened or closed. The profiles in plastic zippers can take on various configurations, e.g. interlocking rib and groove elements having so-called male and female profiles, interlocking alternating hook-shaped closure elements, etc.

Conventional slider-operated zipper assemblies typically comprise a plastic zipper having two interlocking profiles and a slider for opening and closing the zipper. In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction.

Other types of slider-operated zipper assemblies avoid the use of a separating finger. For example, U.S. Pat. No. 5,809,621 discloses a slider-operated zipper assembly wherein one zipper profile has a pair of handles that cooperate with the slider. As the slider is moved in an opening direction, the handles are squeezed together to disengage the profiles. In U.S. Pat. No. 5,442,838, a slider-operated zipper assembly is disclosed wherein the zipper profiles are engaged and disengaged in the course of a so-called "rolling action". This "rolling action" is described as being achieved through cooperation between flanges on the profiles and shoulders that project inwardly from the arms of the slider. U.S. Pat. No. 6,047,450 discloses a zipper comprising a pair of mutually interlockable profiled structures. The first profiled structure comprises an interlocking element on a surface directed toward the second profiled structure and an integral base directed away from the second profiled structure. Likewise, the second profiled structure comprises an interlocking element on a surface directed toward the first profiled structure and an integral base directed away from the first profiled structure. Additionally, portions of the two profiled structures form a fulcrum about which the profiled structures may be pivoted out of engagement when lower edges of the bases are forced towards each other.

One of the important features of such reclosable fastener assemblies are the end stops, which prevent the slider from falling off the end of the fastener when the slider reaches the end of the fastener. End stops have taken on various configurations, such as, for example, riveted end clamps such as those described in U.S. Pat. Nos. 5,067,208 and 5,161,286; transverse end stops made from molten material of the fastener strips, as described in U.S. Pat. No. 5,088,971; reciprocating anvils, as described in U.S. Pat. No. 5,131,121; tubular end stops, as described in U.S. Pat. No. 5,405,478; a window structure combined with sealed zipper ends, as described in U.S. Pat. No. 5,442,837; or plastic end clips fused to the zipper as described in U.S. Pat. No. 5,448,807.

U.S. Pat. No. 5,950,285 discloses a reclosable bag having end stops that prevent a slider from moving beyond the end of the zipper when the slider reaches either the closed or fully open position. The end stops are formed from the material of the zipper profiles and "rise vertically" from the zipper to block and prevent further movement of the slider. The end stops are formed by first aligning together the opposing profiles at an end stop area proximate to an end of the bag, and then fusing the zipper profiles at the end stop area to provide a vertical structure for preventing movement of the slider past the ends of the zipper, while at the same time keeping the rails intact. Preferably, the profiles are fused by directing ultrasonic energy to the end stop area. Optionally, the end stops have ridges disposed along their surfaces.

In addition, U.S. Pat. No. 6,357,914 discloses a slider-operated zipper in which the ends of the zipper profiles are deformed or "crushed" to form slider end stops. Preferably, the slider end stops are formed by the application of ultrasonically generated heat and pressure to the ends of the zipper profiles. The sides of the zipper profiles are softened and compressed at end stop areas so as to impart a preselected width and an upwelling displacement above the uppermost surfaces of the zipper profiles. The material displaced above the upper surface of the zipper profiles interferes with the top wall and ends of the slider to limit its sideways travel along the zipper. The slider end stops (that is, the deformed portions of the zipper profiles) are configured to avoid deformation of the bottom surfaces of the zipper profiles. The lower ends of the zipper profiles extend undeformed substantially to the side edges of the package. The end stops and the undeformed bottom surfaces of the zipper profiles in the area of end stops cooperate to hold the slider, preventing the slider from being unintentionally derailed. The '914 patent asserts that separation of the "crushing" operation performed on the zipper profiles to form the slider end stops from the conduction heat sealing operation to form the side seals allows the end stops to be reduced in size, effectively extending the size of the package opening without sacrificing the ability of the end stops to effectively retain the slider on the zipper.

There is a need for a method and an apparatus for ultrasonically deforming the ends of a slider-operated zipper to form structures capable of stopping a slider from sliding off an end of the zipper when incorporated in reclosable packaging.

BRIEF DESCRIPTION OF THE INVENTION

The invention is directed to a method and an apparatus for ultrasonically stomping the ends of a flexible zipper for forming slider end stops in a reclosable package. The invention is further directed to slider-operated zippers having stomped ends of a particular structure and reclosable packages incorporating such zippers.

One aspect of the invention is an ultrasonic welding assembly comprising a horn and an anvil, wherein the horn comprises a generally T-shaped flattening surface.

Another aspect of the invention is an ultrasonic welding assembly comprising a horn and an anvil, wherein the horn comprises a flattening surface and a plurality of projections projecting out of the flattening surface. Each projection comprises first and second surfaces that are neither parallel nor perpendicular to the flattening surface. The first and second surfaces are inclined at different angles.

Yet another aspect of the invention is an ultrasonic welding assembly comprising a horn having a flattening surface of predetermined shape, an anvil and an anvil cover overlying opposing portions of said anvil, wherein the anvil cover comprises a cutout and the flattening surface of the horn fits in the cutout.

A further aspect of the invention is an assembly comprising a flexible zipper and a slider mounted to the zipper, wherein the zipper comprises a first zipper part comprising a first interlockable element and a second zipper part comprising a second interlockable element, the first and second interlockable elements being mutually interlockable, and the zipper further comprising first and second slider end stops located at opposing ends of the zipper parts, wherein each end stop comprises flattened zipper material having a plurality of spaced spot-shaped indentations.

Yet another aspect of the invention is a package comprising a receptacle, a flexible zipper joined to the receptacle and a slider mounted to the zipper, wherein the zipper has the structure described in the preceding paragraph.

Another aspect of the invention is a method for forming a slider end stop on a flexible zipper. The method comprises the following steps: interlocking first and second parts of a zipper; inserting a slider on the interlocked zipper parts; and transmitting sufficient ultrasonic wave energy into a T-shaped area of the interlocked zipper parts to cause the latter to flatten and fuse in the T-shaped area. The rails of the interlocked zipper parts are undeformed on both sides of a stem of the T-shape.

Other aspects of the invention are disclosed and claimed below.

DETAILED DESCRIPTION OF THE INVENTION

Figure 1:
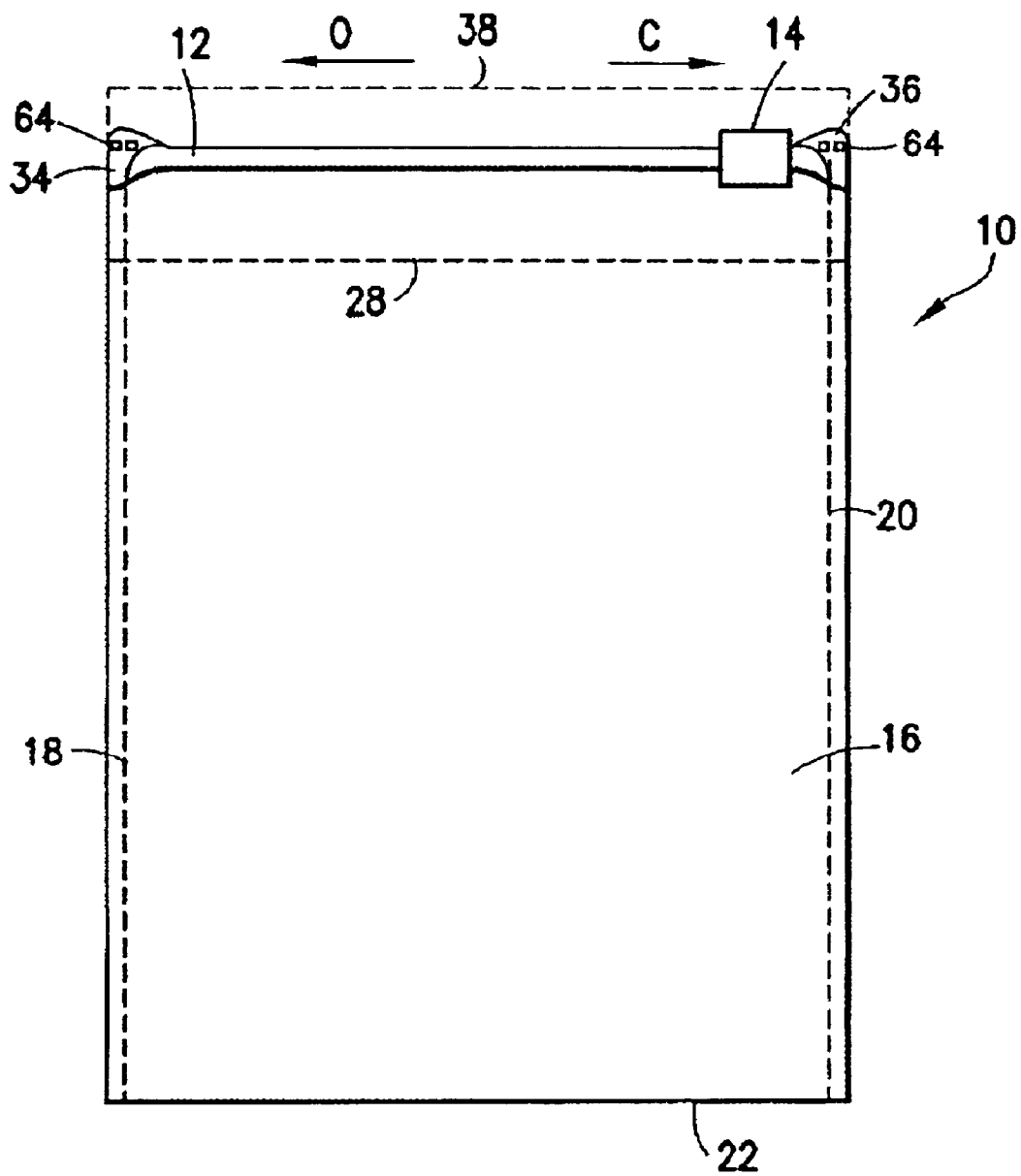
FIG. 1 is a schematic showing a reclosable package having a slider-operated zipper with end stops in accordance with one embodiment of the invention.

Reference will now be made to the drawings, in which similar elements in different drawings bear the same reference numerals. A reclosable package or bag 10 having a flexible plastic zipper 12 operated by manipulation of a slider 14 is shown in FIG. 1. It should be understood that the slider-zipper assemblies disclosed herein can be installed in a reclosable package or bag of the type shown in FIG. 1 or other types of reclosable packages having different structures.

Still referring to FIG. 1, the bag 10 may be made from any suitable sheet material or plastic film and comprises opposing wall panels (only the front panel 16 is visible in FIG. 1), which may be secured together at opposite side edges of the bag by seams 18 and 20 (indicated by dashed lines). The opposing bottoms of the wall panels may be joined, for example, by means of a heat seal made in conventional fashion, e.g., by application of heat and pressure or ultrasonic energy. Typically, however, the bottom of the package is formed by a fold 16 in the original packaging film, as seen in FIG. 1.

Figure 3:
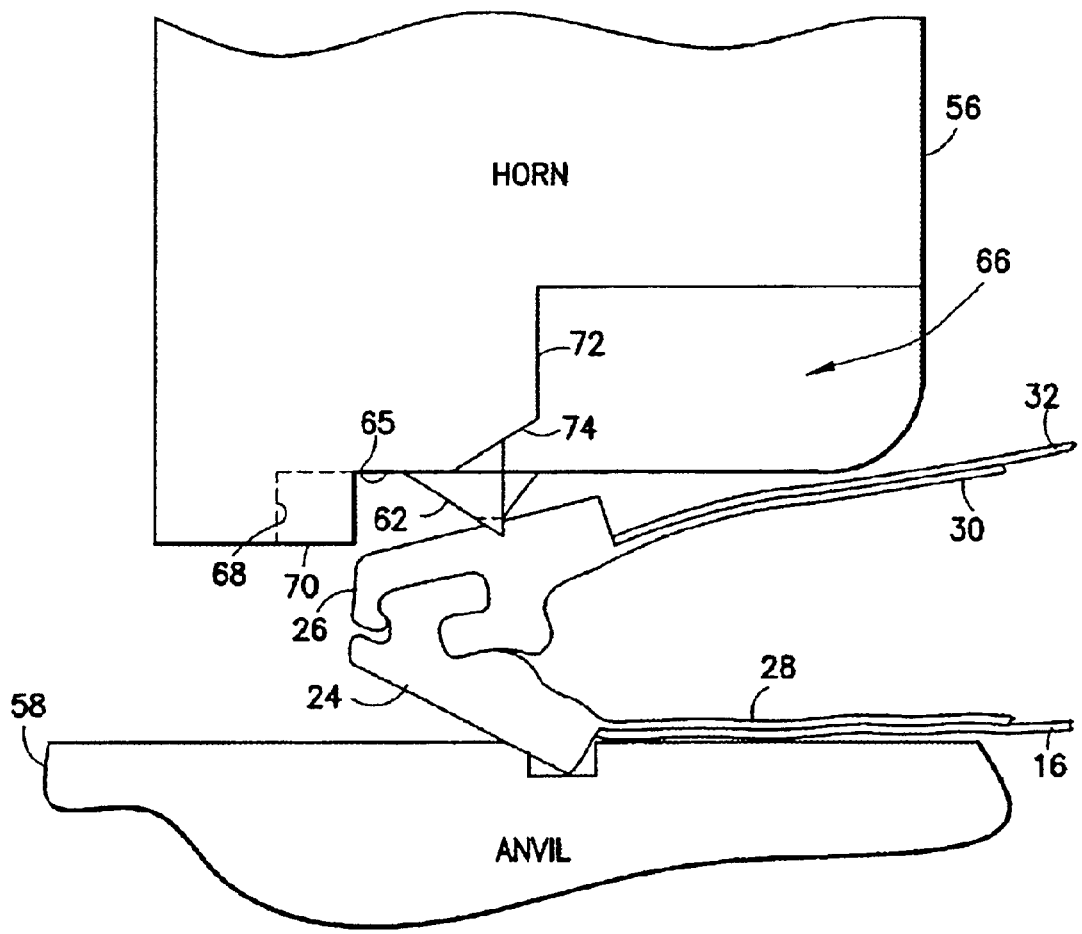
FIG. 3 is a schematic showing an end view of a zipper sandwiched between a horn and an anvil at the start of ultrasonic stomping in accordance with one embodiment of the invention.

At its top end, the bag 10 has an openable mouth, on the inside of which is an extruded plastic zipper 12. The zipper 12 comprises a pair of interlockable fastener strips or zipper halves 24 and 26 (best seen in FIG. 3). Although FIG. 3 shows a rib and groove arrangement, the profiles of the zipper halves may take any form. For example, the zipper may comprise interlocking rib and groove elements or alternating hook-shaped closure elements. The preferred zipper material is polyethylene.

The front and rear bag wall panels 16, 32 (seen in FIG. 3) are respectively sealed to the zipper halves by heat fusion or welding. Alternatively, the interlockable zipper halves can be attached to the wall panels by adhesive or bonding strips or the zipper profiles can be extruded integrally with the bag material. For the purpose of joinder, the zipper halves may be provided with respective extension flanges 28, 30, to which an upper portion of the respective bag wall panel is fused or welded. The walls of the bag may be formed of various types of thermoplastic material, such as low-density polyethylene, substantially linear copolymers of ethylene and a C3–C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. The bag material may be either transparent or opaque. The bottom edge of extension flange 28 is indicated by a dashed line in FIG. 1 for the case where the bag wall panels are opaque.

Optionally, the bag 10 may be provided with an enclosed header 38, indicated by dashed lines in FIG. 1, which encompasses the zipper and the slider. Alternatively, the header may be provided with openings on both sides at the closed position of the slider, with the openings being sized and shaped to allow the slider to protrude through the openings on both sides of the header. The header 38 may be a panel or strip formed from the same material as that comprising the walls of the package or from the same material as that comprising the zipper or from an entirely separate material. More specifically, the header may comprise a panel of thermoplastic material that is heat sealed or ultrasonically welded to either the zipper flanges or the package walls. Alternatively, the header may be formed as an extension of the zipper flanges or the package walls.

In zippered bags with sliders, as the slider moves across the zipper, the zipper is opened or closed. As shown in FIG. 1, the slider is slidable along the zipper in a closing direction "C", causing the zipper halves to become engaged, or in an opening direction "O", causing the zipper halves to become disengaged.

The slider for opening or closing the reclosable zipper is generally shaped so that the slider straddles the zipper profiles. The slider may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

The bag shown in FIG. 1 further comprises end stops 34 and 36 for preventing the slider from sliding off the end of the zipper when the slider reaches the closed or fully opened position. Such end stops perform dual functions, serving as stops to prevent the slider from going off the end of the zipper and also holding the two zipper profiles together to prevent the bag from opening in response to stresses applied to the profiles through normal use of the bag. In accordance with one embodiment of the invention, the end stops comprise stomped areas on the zipper profiles themselves. The stomped end stops comprise sections of the profiles that have been fused together and flattened proximate to the open and closed slider positions. During deformation, thermoplastic zipper material flows upward such that the end stops are raised in height above the peak of the undeformed zipper on which the slider rides. Stomping is carried out using ultrasonic welding equipment of the type disclosed herein. As seen in FIG. 1, each end stop 34, 36 has a plurality (i.e., two or more) of spaced indentations 64 that are formed during ultrasonic welding for reasons to be described in detail below.

Figure 2:
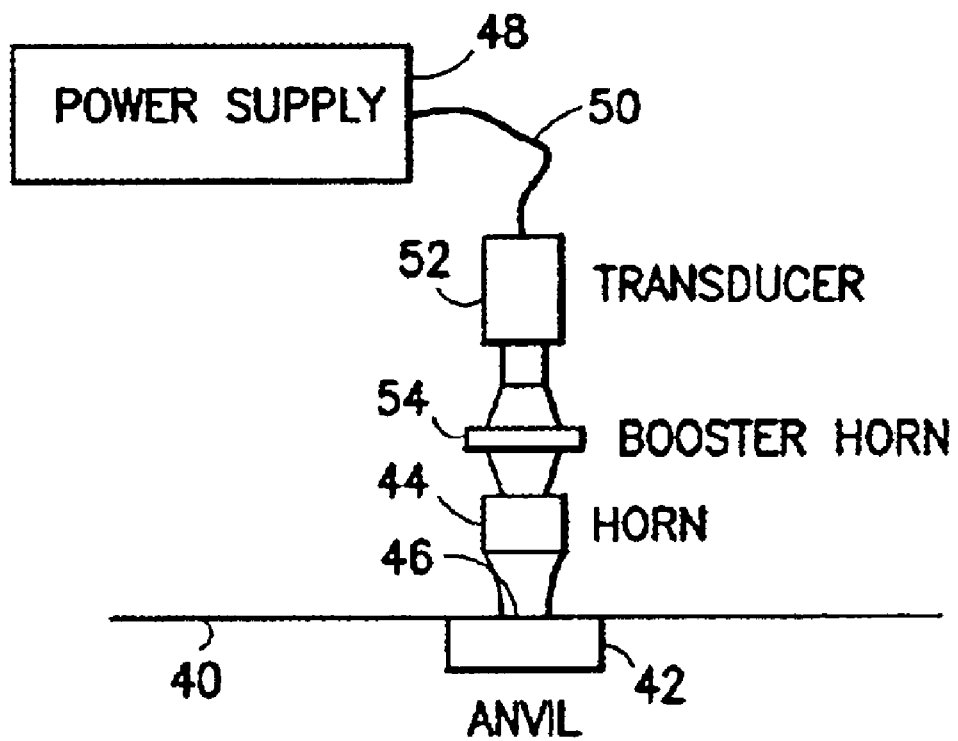
FIG. 2 is a schematic showing a typical ultrasonic welding apparatus for welding thermoplastic material.

Welding and sealing of thermoplastic material by ultrasonic vibrations is an established process and has been used for forming slider end stops on the ends of a slider-operated zipper in a reclosable package. FIG. 2 shows a typical ultrasonic welding apparatus in which a workpiece 40 is fed through an ultrasonic weld station comprising an anvil 42 and an oppositely disposed resonant horn 44. The frontal surface 46 of the horn 44 and the anvil 42 are urged toward mutual engagement by force means, not shown, for causing the horn to be in forced contact with the workpiece for coupling the ultrasonic vibrations into the material, thereby effecting ultrasonic welding. The horn 44 is energized from a power supply 48 that provides electrical high-frequency power at a predetermined ultrasonic frequency via a cable 50 to an electroacoustic transducer 52, which, in turn, provides mechanical vibrations at that frequency to a booster or coupling horn 54 for coupling these vibrations to the horn 44. The horns 44 and 54 and the transducer 52 are dimensioned to be mechanically resonant longitudinally at the predetermined frequency. This combination of components forming an ultrasonic welding apparatus is well known to those skilled in the art.

The present invention is directed in part to an apparatus for ultrasonic welding. Its application in a method for ultrasonically stomping slider end stops on a flexible zipper of a reclosable package will be disclosed herein. However, the apparatus disclosed herein is not limited in its application to a particular type of workpiece.

The horn and anvil of the ultrasonic welding apparatus disclosed herein are specifically designed so that the ultrasonic stomping operation accomplishes at least some of the following goals: create a vertical hump on the zipper to stop the slider; preserve the base of the zipper profile to resist pull-off of the slider; penetrate the heat into the mass of the zipper profile in the end stop areas and melt the hooks of the zipper profiles to each other and into the base; prevent the zipper from opening or shifting during stomping; direct the flow of the molten plastic upward toward the hump-stop at the ends of the stomp; control the heat of the plastic to prevent hot spots that cause holes in the bag and prevent the flange attachment from burning, away from the base of the zipper; and guiding/locating the zipper in the stomper. Various designs in horns and anvils were tried with matched contours, base guide grooves, holding and energy-directing teeth, a "dam" to control the material flow, heated anvil, etc., all to help shape the end stomp. Special guides and cover plate designs were developed to guide the profile at the ultrasonic stomp and to direct cooling toward the ends of the stomp. The horn and anvil were designed to provide end stomps with improved appearance and high end pull-ff forces.

Referring to FIG. 3, the ultrasonic welding apparatus comprises a horn 56 and an anvil 58, which are brought together with the flexible zipper of a reclosable package therebetween. As will be explained in more detail below, the anvil 58 comprises a slot 60 in which a portion of one zipper half, e.g., zipper half 24 having a male profile, is inserted, while the horn comprises a plurality of teeth 62, which penetrate into the mass of thermoplastic material forming the zipper half 26 having a female profile. Although placing the zipper half with the female next to the horn is preferred, this is not manadaory. During the ultrasonic stomping procedure, the horn 56 is displaced downward and toward the stationary anvil 58. FIG. 3 shows the horn 56 in a position whereat the teeth 62 have just come into contact with the zipper half 26. The horn is activated to couple ultrasonic waves into the zipper material while applying pressure. As a result, portions of the zipper halves 24 and 26 will be deformed and flattened, with indentations (64 in FIG. 1) being formed in the flattened thermoplastic material by the teeth 62. The portion of the zipper halves that is flattened is determined by the extent of the flattening surface 65 of the horn 56. As seen in FIG. 3, the horn has a recess 66 where no flattening occurs, i.e., the base portions or rails of the zipper halves 24 and 26 are left undisturbed. Preferably, the boundary 72 of the recess 66 is generally aligned with the left-hand (as seen in FIG. 3) wall of the slot 60 in the anvil 58. The horn 56 further comprises a beveled surface 74 having a juncture with wall 72 and a juncture with the flattening surface 65.

An additional structural feature seen in FIG. 3 is a rail 68 that projects downward of the flattening surface 65. As will be explained in more detail below, the rail 68 serves as a dam for blocking and deflecting the flow of thermoplastic material across the flattening surface during the ultrasonic stomping operation. The confronting wall 68 of the dam is represented by a dashed line in FIG. 3 because it is hidden behind a side rail 70 from the vantage shown in FIG. 3.

Figure 4:
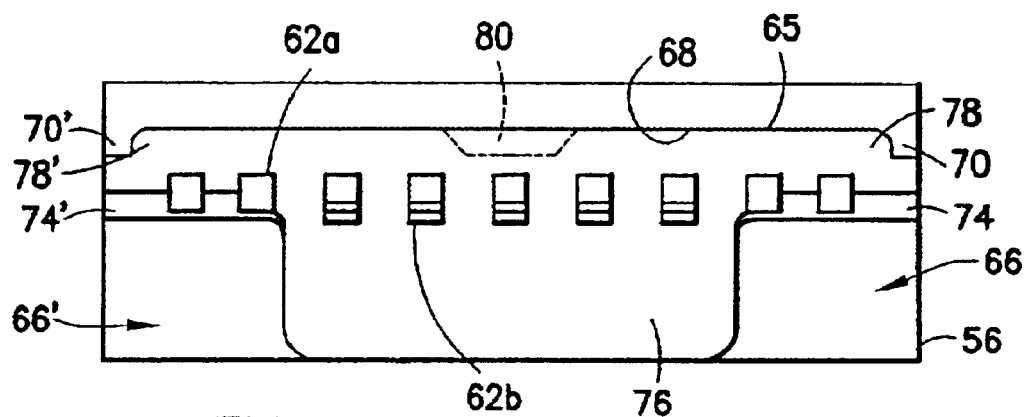
FIGS. 4–6 are schematics respectively showing bottom, front and end views of a horn in accordance with one embodiment of the invention.
Figure 5:
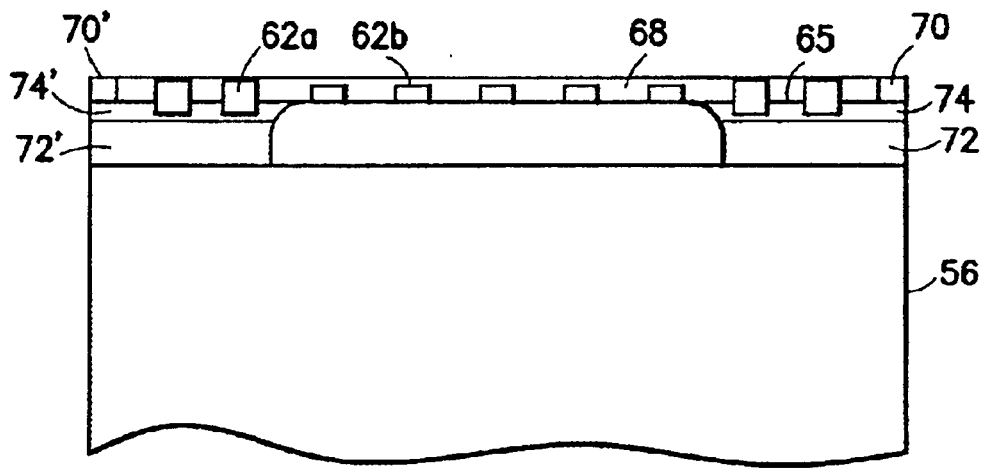

The horn in accordance with one embodiment of the invention will now be described in more detail with reference to FIGS. 4–6. This horn design has a rectangular shape with a minimum size footprint in order to maximize the focus of the ultrasonic wave energy at high bag line speeds and to avoid leaker bags by directing the vibrational energy into the mass of the zipper and away from the flange attachment location. As seen in FIG. 4, the face of the horn that confronts the anvil has a generally T-shaped planar flattening surface 65 with a wide stem 76 and a pair of arms 78 and 78'. When the horn is installed in the ultrasonic welding apparatus, the flattening surface 65 is substantially perpendicular to the direction of horn displacement and generally parallel to the opposing face of the anvil, as previously shown in FIG. 3. The stem 76 is flanked on both sides by respective recesses 66 and 66'. The horn 56 comprises a pair of beveled surfaces 74 and 74'. Bevel 74 has a juncture with wall 72 of recess 66 and a juncture with the flattening surface 65; similarly bevel 74' has a juncture with wall 72' of recess 66' and a juncture with the flattening surface 65. The bevel 74 and 74' save more rail on the female zipper profile.

The geometry of the flattened area causes the zipper material to be heated by the ultrasonic energy while the recessed areas minimize the clamping and prevents the material from heating. This causes the zipper material to flow upward in a desired pattern above the top of the zipper to assist in acting as a stop for the slider. The geometry also causes flattening and localized clamping to cause part of the bottom of the zipper at the base to stomp or crush together at the center of the stomp while the recessed area of the tooling prevents the thickness of the base from being reduced. The preservation of this existing material thickness at the base of the zipper profile, particularly at the outer edges of the length of the stomp, is required for keeping the slider from rotating upward and off the zipper at the park position.

The rectangular horn 56 has a rail 68 along the top at a special depth and location to trap the top of the zipper material as it melts and flows outward during stomping and acts as a dam when the female profile is up against the horn. If the female profile is down, the dam could be on the anvil. The sides of the dam, i.e., side rails 70 and 70', assist in abruptly shaping the melted thermoplastic zipper material and packing it up into this area. In the final product, this abrupt shape acts as an improved stop for the slider to bump against, which increases the pull-off force. The recessed areas act as transition zones that gradually decrease the amount of compression at this location during the ultrasonic stomping. This keeps the profile from becoming molten immediately outside the edge of the dam, reduces stringing of the plastic, and improves the appearance of the stomp. Optionally, a projection 80 (indicated by dashed lines in FIG. 4) in the shape of a so-called "widow's peak" can be incorporated in the dam to redirect thermoplastic material from the middle of the anvil and toward the starting point of the end stop, thereby improving pull-off resistance. For example, the profile of the widow's peak may be an inverted trapezoid with side walls inclined at 45 degree angles.

As best seen in FIG. 4, the horn 56 is provided with a multiplicity of teeth arranged in a line at spaced intervals. In this embodiment, two types of teeth are shown. A first plurality of teeth 62b occupies a central section of the line of teeth, while a second plurality of teeth 62a occupies flanking sections of the line on opposite sides of the central section.

Each tooth 62a has a prismatic shape with an inclined surface and three side wall surfaces, each of the three side walls being perpendicular to the flattening surface 65, while the inclined surface is inclined at an angle of 30 degrees relative to the flattening surface. The profile of each tooth 62a is a right triangle, as seen in FIG. 6. Thus, each tooth 62a has one rectangular side wall and two triangular side walls, the triangular side walls being mutually parallel and perpendicular to the rectangular side wall. Likewise the inclined surface, which faces the dam, is rectangular, as seen in FIG. 4. In the embodiment shown in FIGS. 4–6, there are two teeth 62a projecting in part from arm 78 of the flattening surface 65 and in part from bevel 74; and two teeth 62a projecting in part from arm 78' of the flattening surface 65 and in part from bevel 74'. The beveled surface is inclined at an angle of 30 degrees (see FIG. 6) relative to the flattening surface 65.

Figure 6:
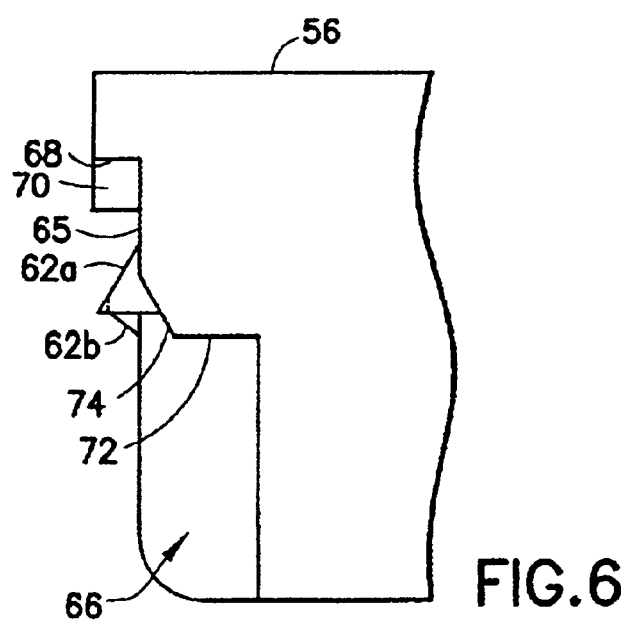
Figure 11:
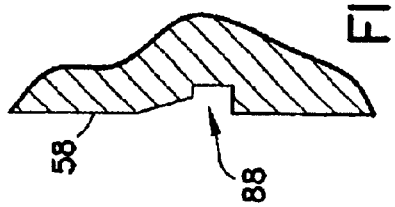
FIGS. 9–11 are schematics showing cross-sectional views of the anvil depicted in FIG. 7, with the sections being taken along the lines respectively indicated by 9—9, 10—10 and 11—11 in FIG. 7.
Figure 10:
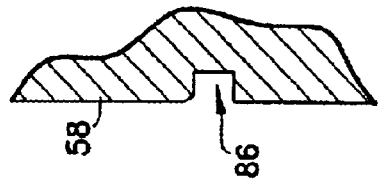
Figure 9:
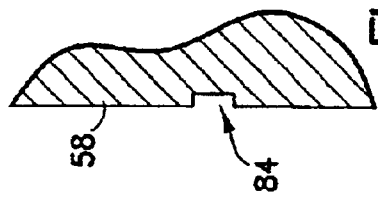

Each tooth 62b has the same width (i.e., distance between parallel side walls) as the width of teeth 62a, but a different length (as seen in FIG. 4) and a different geometry, as seen in FIG. 6 (where a tooth 62b is shown behind a tooth 62a as seen from the side). In the embodiment shown in FIGS. 3–6, each tooth has the shape of a truncated prism. More specifically, each tooth 62b has two inclined surfaces separated by an end facet (these three surfaces can be seen in FIG. 4) and two mutually parallel side wall surfaces, each of the two side walls being perpendicular to the flattening surface 65, while one inclined surface is inclined at an angle of 30 degrees relative to the flattening surface and the other inclined surface is inclined at an angle of 60 degrees relative to the flattening surface. The former inclined surface faces toward the dam, while the latter inclined surface faces away from the dam. The profile of each tooth 62b is a trapezoid, as seen in FIG. 6. Thus, each tooth 62b has two trapezoidal side walls that are mutually parallel and perpendicular to the flattening surface 65. The end facet of each tooth 62b is preferably parallel to the flattening surface. In the embodiment shown in FIGS. 4–6, there are five teeth 62b projecting from stem 76 of the flattening surface 65.

The teeth 62b act as vertical energy directors to penetrate the heat into the center of the zipper directly into the fulcrum area of the profiles. The greatest amount of welded zipper material will be produced in the locations penetrated by teeth 62b, so the teeth need to be properly positioned vis-à-vis the zipper. Also, due to the high cycle rate of the stomping requirement, it is important to get the heat into the center of the zipper material mass as soon as possible. The different angles of inclination of the inclined surfaces enables each tooth 62b to act as a material flow director to maximize the flow of the molten zipper material toward the dam and minimize the flow toward the zipper flange. Also the peaked teeth 62a help keep the zipper aligned during the stomping operation as the teeth 62b heat and penetrate the outside of the profile. The teeth keep the zipper from rocking open and disengaging during the stomping. Alternating teeth can be positioned on both the horn and anvil, but tests showed that teeth on the horn are preferred because the zipper was more stable and kept better alignment as the horn and anvil came together.

The edges 72 and 72' of the horn penetrate the zipper during stomping at a position above the zipper base, which preserves the lower part of the base and maintains the cross section width at the edge of the bases. This provides for keeping the engagement of the slider hooks around the base, which is important to keep the slider from being pulled off the end stop.

The large stem 76 of flattening surface 65 of the horn serves to flatten the bases of the zipper and weld the profiles together at the center of the stomp. The T-shaped flattening surface allows for crushing of the bases for a specified width only at the center in order to prevent open end channel leakers, while maintaining the integrity of the bases at the end of the stomp. The T-shaped horn (or T-shaped anvil, if desired) reduces the thickness of the zipper to an acceptable thickness at the cross seal and cut-off location of the bag such that additional stomping will be minimal or not required, especially on vertical consumer packaged goods applications where space is limited.

Figure 7:
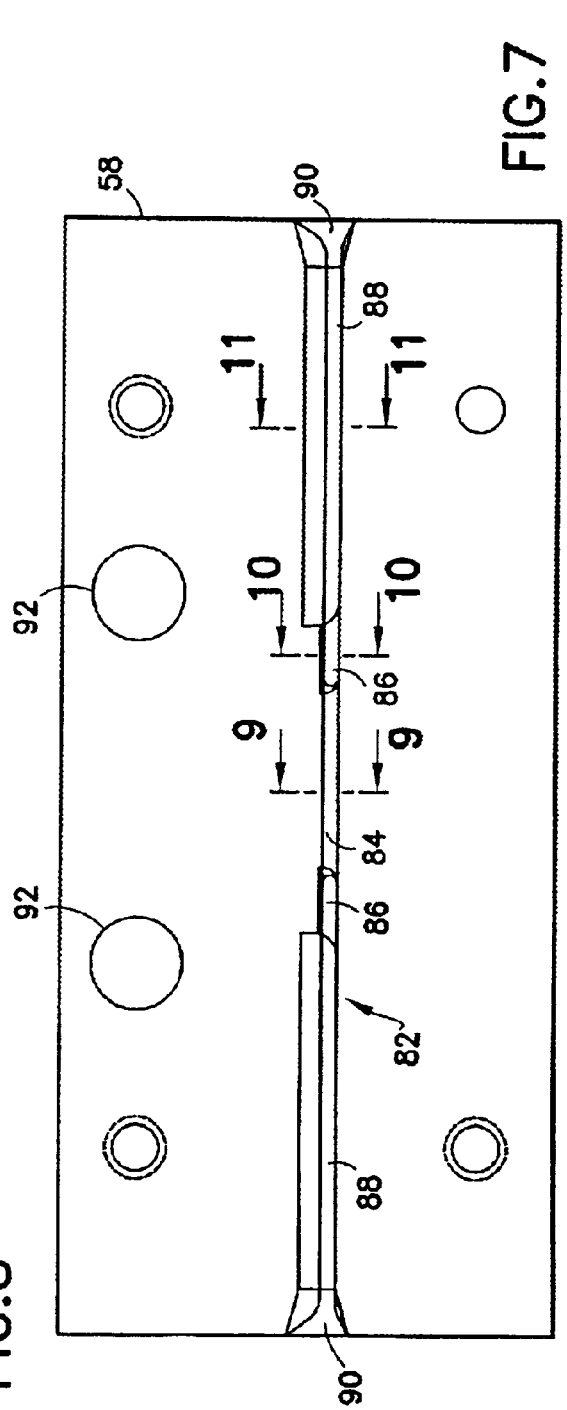
FIG. 7 is a schematic showing a top view of an anvil in accordance with one embodiment of the invention.
Figure 12:
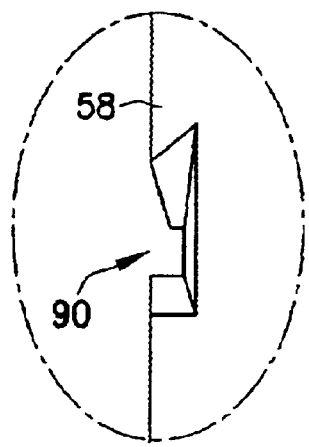
FIG. 12 is a schematic showing a magnified view of the area indicated by reference numeral 12 in FIG. 8.

The anvil in accordance with one embodiment of the invention will be described with reference to FIGS. 7–12. As seen in FIG. 7, the anvil 58 has a rectangular shape with a recess or slot (generally indicated by arrow 82) of varying cross-sectional profile extending in a longitudinal direction across the surface of the anvil. The recess or slot 82 across the tooling preserves the base of the zipper profiles across the entire length of the ultrasonic stomp. This slot or recess also removes the clamping force along the bottom of the length of the base where the flange attaches to the zipper profile. The slot or recess 82 in the anvil (whether full or partial in length) acts as a guide to prevent the zipper from sliding or shifting out from under the horn during welding due to the side forces caused by the angle of the wedge-shaped zipper seen in FIG. 3. The slot in the anvil (whether full. or partial in length) also relieves the clamping force at the base of the wedge shape and helps prevent the zipper from opening during crushing. If the zipper rocks open during stomping, it can become misaligned and the slider will not stay activated properly at the park position, becoming deactivated. For this reason, the preferred way to stomp the: profile is with the male profile down against the anvil.

Another way to prevent the wedge-shaped zipper from rocking/pivoting open during the stomping procedure is to heat one of the legs of the profile, either directly or through the anvil or horn, in order to minimize its bend strength. For example, a cartridge heater can be inserted in a recess formed in the anvil underneath the surface opposing the horn to assist in pre-heating the zipper in the stopped position and adding to the heating during ultrasonic stomping.

Figure 15:
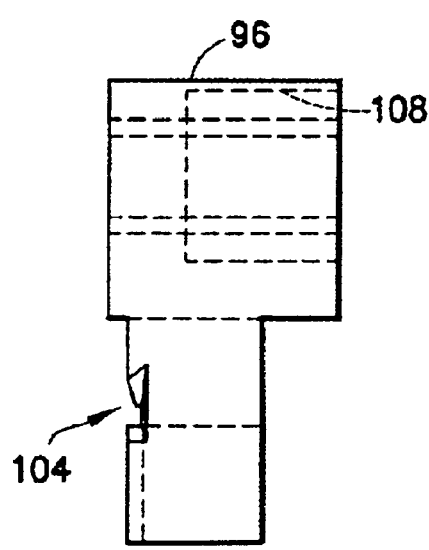
FIGS. 13–15 are schematics showing bottom, front and end views of an anvil cover in accordance with one embodiment of the invention.
Figure 13:
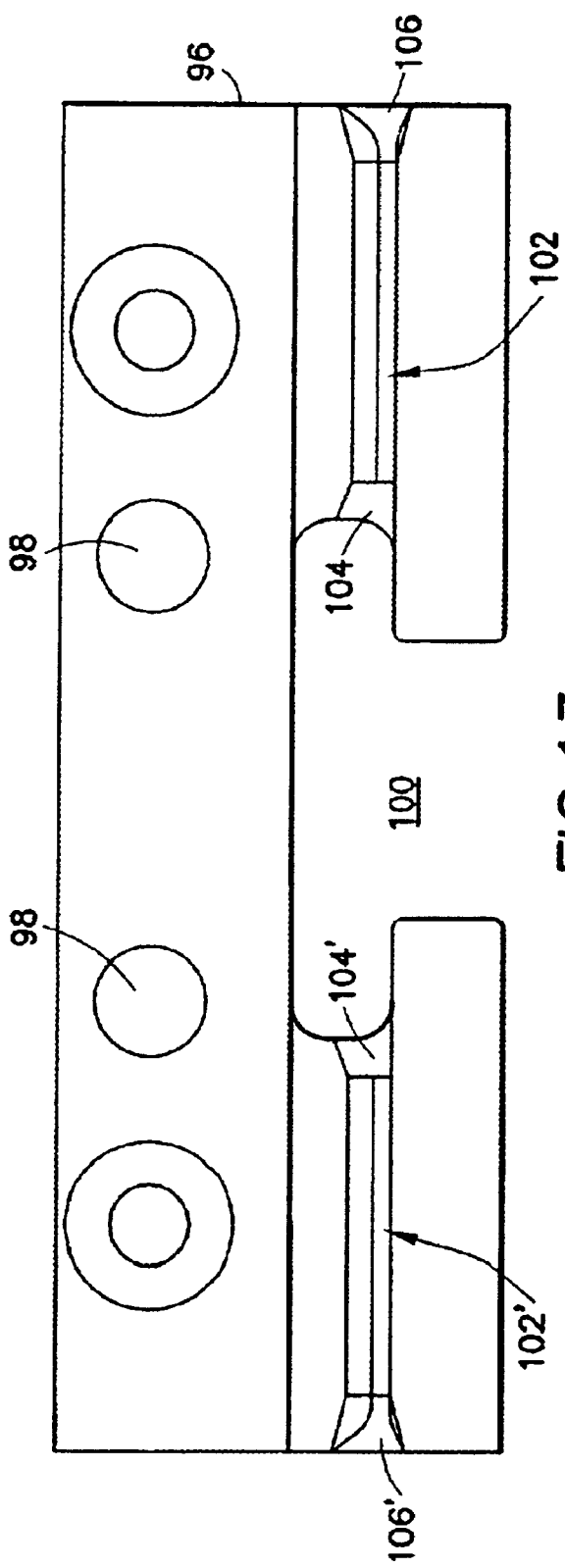
Figure 14:
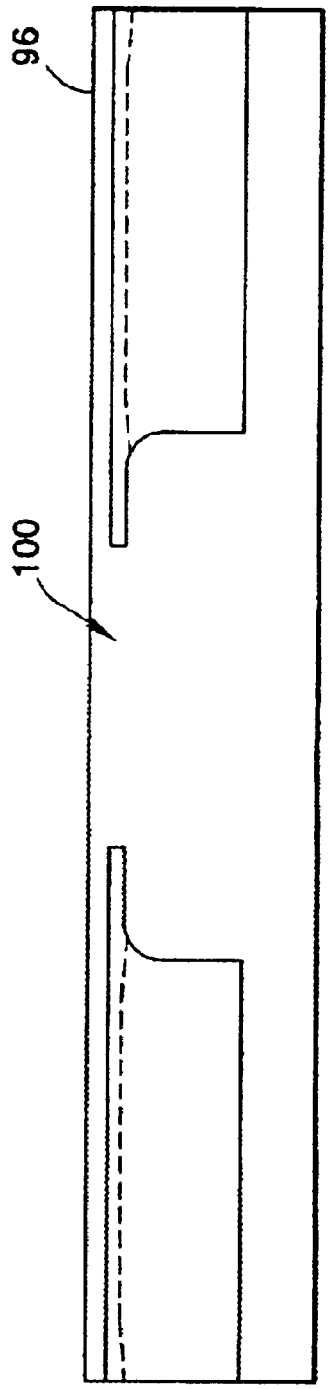

In accordance with one embodiment of the invention, an anvil cover is placed over the anvil. One embodiment of an anvil cover 96 is depicted in FIGS. 13–15. The anvil cover has a T-shaped cutout 100 (best seen in FIG. 13) that is shaped to allow the T-shaped flattening surface of the horn to pass through and close with the anvil. The bottom surface of the anvil cover, which opposes the anvil surface shown in FIG. 7, is shown in FIG. 13. As seen therein, the anvil cover has a recess or slot 102 that overlies one portion of the recess or slot (82 in FIG. 7) formed in the anvil and a recess or slot 102' that overlies another portion of the recess or slot in the anvil. The slots 102, 102' in the anvil cover, in combination with slot 82 in the anvil, form a passageway for the zipper to slide through. The cross-sectional profile of slot 82 in the anvil 58 changes as seen in FIGS. 9–12. Slot sections 84 (see FIG. 9) in the anvil have a rectangular profile; slot sections 86 (see FIG. 10) in the anvil have a rectangular profile with a slight bevel on one side; slot sections 88 (see FIG. 11) in the anvil have a rectangular profile with a larger bevel on one side; and the slot end sections 90 (see FIG. 12) comprise three converging surfaces. The angled slot end sections 90 at the outer edges of the extended anvil and the angled slot end sections 106, 106' at the outer edges of slots 102, 102' of the anvil cover act as built-in zipper guides that provide improved guidance and keep the zipper from pivoting. The inner edges 104, 104' where the anvil cover is cut-out act as guides to keep the base of the profile aligned and to prevent the base from squeezing out toward the flange when the stomping process starts. They also help the teeth keep the zipper base in position during stomping.

Figure 8:
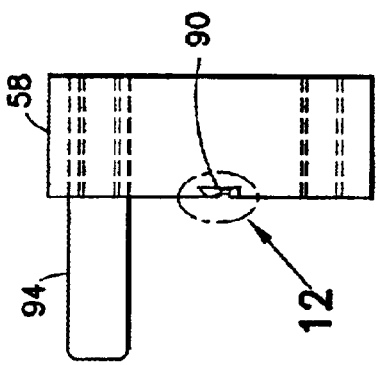
FIG. 8 is a schematic showing an end view of the anvil depicted in FIG. 7, with a dowel pin inserted in a hole formed in the anvil.

The anvil and anvil cover are fastened together by spring-loaded bolts (not shown). Proper alignment of the cover with the anvil is ensured by a pair of dowel pins 94, only one of which is shown in FIG. 8. Holes 92 (see FIG. 7) are provided in the anvil for receiving one portion of the dowel pins, while holes 98 are provided in the anvil cover for receiving another portion of the dowel pins. The distance separating the centers of holes 92 in the anvil equals the distance separating the centers of holes 98 in the anvil cover. Alternatively, the anvil cover may incorporate a key that matches a keyway formed in the anvil to guarantee the alignment of components during stomping. The cover also contains a seat 108 (see FIG. 15) configured to receive a heavy-duty spring and bolt that hold the cover closed properly on the zipper. Optionally, ergonomic levers (not shown) can be used to unload the springs while threading the zippered film through the stomping assembly.

Optionally, the anvil cover may incorporate a manifold and/or air blast holes that provide cooling to the flange attachment location of the zipper during ultrasonic heating/stomping. This will help cool down the stomp after welding in order to avoid leaker bags and also help set the shape of the stomp at high cycle rates. Alternatively, the cut-out area 100 of the anvil cover can be used to allow an air blast to reach the entire surface of the flange and base area being crushed by the T-shaped flattening surface of the horn.

Although the disclosed embodiment of the ultrasonic horn has a row of spaced teeth, the teeth need not be arranged in a line. For example, the teeth can be staggered. Nor must the teeth be shaped to leave a square of rectangular indentation. The indentations formed in the flattened zipper stomp area can be spots having other geometries, e.g., circular or elliptical. Since ultrasonic energy directors are needed most where the zipper material is thickest, the teeth are placed so as to not form indentations near the peak of the peak, where the zipper has minimal width.

Figure 16:
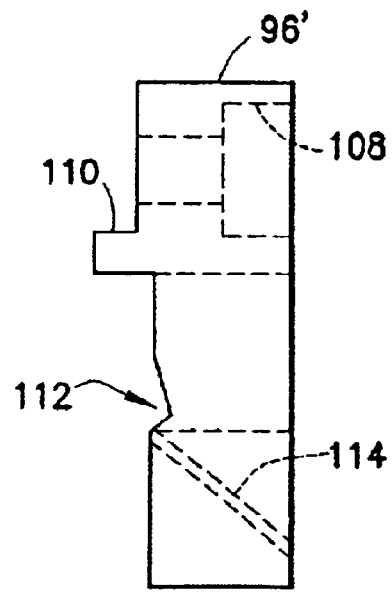
FIG. 16 is a schematic showing an end view of an anvil cover with an air blast passageway in accordance with another embodiment of the invention.

FIG. 16 depicts another embodiment of an anvil cover 96' having a recess 108 for receiving a spring, keyway 110 that fits in a matching key on the anvil to align the tooling, an angled slot 112 for guiding and holding the zipper, and n air blast passageway 114. The passageway 114 has first and second openings, wherein the first opening is located on a side of the anvil cover adjacent the slot 112 and the second opening on the other side of the anvil is in communication with a source of pressurized air (not shown).

In accordance with one method of manufacture, package film is paid off a roll. Downstream a pull roller is provided for driving the film through the machine. A folder plow positioned downstream of the film roll folds the package film about a bottom crease (22 in FIG. 1) to form opposing package walls. Zipper tape is paid off a spool and fed between the advancing package walls. The zipper tape is passed around a guide roller and fed in the machine direction at a predetermined height from the bottom fold in the package film. At a first sealing station, the zipper tape is sealed to the package walls by a pair of horizontal sealing bars. After this sealing operation, the packaging film is advanced one package increment. The zipper tape is then stomped at a stomping station comprising the horn and anvil disclosed herein, thereby forming slider end stops. After stomping, the packaging film is again advanced one package increment. Then at a second sealing station, the folded film and zipper tape are cross-sealed by a pair of vertical sealing bars to form discrete packages. Then at a cutting station, the individual packages are cut from one another. The separated packages are then ready to be filled. Alternatively, the packages can be filled before cutting.

In accordance with one embodiment, the method for forming slider end stops on the zipper comprises the following steps: joining interlocked zipper parts to opposing walls of film material; ultrasonically deforming the zipper parts to form a flattened T-shaped area having a stem oriented generally transverse to the machine direction; cross sealing the opposing webs of film along a strip-shaped area generally oriented in the transverse direction; and cutting the cross-sealed strip of the opposing webs along a line generally oriented in the transverse direction, the cut generally bisecting the flattened T-shaped area. Thus, during each stomping operation, end stops at adjacent edges of successive packages are formed. The strip-shaped area of cross sealing overlaps the flattened T-shaped area. The deforming step comprises the steps of flattening the zipper material at the ends of the zipper parts and forming a series of spaced indentations in the flattened T-shaped area. Optionally, the method further comprises the step of pre-heating at least one of the zipper parts prior to ultrasonically deforming the zipper parts. Optionally, the method may further comprise the step of directing cooling fluid toward a flange of at least one of the zipper parts during the ultrasonic deformation.

In accordance with another embodiment, a module is attached to the side of a form/fill/seal (FFS) machine. The module applies a slider to the zipper and stomps the zipper, using a horn and anvil of the type disclosed herein. These steps can be performed concurrently or in alternating sequence. Then the prepared zipper/slider assembly is fed into the FFS machine. Depending on the type of FFS machine, the zipper/slider assembly is fed either longitudinal (in the machine direction) or transverse (in the cross direction) to the direction of film web advancement using a registered/guided method. Then the flanges of the zipper halves are welded to the webs after the slider insertion and zipper stomping procedures. The completed web is then cross-sealed and cut-off in conventional fashion to form a separate package.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "package" means a container, bag, pouch or other receptacle for objects, material or stuff. A container, bag, pouch or other receptacle is deemed to be a package even if not yet packed with objects, material or stuff. As used in the claims, the verb "joined" means fused, bonded, sealed, adhered, etc., whether by application of heat and/or pressure, application of ultrasonic energy, application of a layer of adhesive material or bonding agent, interposition of an adhesive or bonding strip, co-extrusion (e.g., of zipper and bag), etc.

What is claimed is:

1. An ultrasonic welding assembly comprising a horn and an anvil, wherein said horn comprises a generally T-shaped flattening surface and a rail projecting forward of said flattening surface, said rail being shaped to serve as a dam for flowing thermoplastic material.

2. The assembly as recited in claim 1, wherein said horn further comprises a plurality of vertical energy directors designed to direct ultrasonic energy into a mass of thermoplastic material and deflect flowing thermoplastic material of said mass toward said dam.

3. The assembly as recited in claim 1, wherein said rail further comprises a truncated projection shaped to deflect material flow away from a center of said rail.

4. An ultrasonic welding assembly comprising a horn and an anvil, wherein said horn comprises a generally T-shaped flattening surface and a plurality of projections projecting out of said flattening surface, each of said plurality of projections comprising first and second surfaces that are neither parallel nor perpendicular to said flattening surface, said first and second surfaces being inclined at different angles.

5. The assembly as recited in claim 4, wherein each of said plurality of projections comprises a third surface having a first junction with said first surface and a second junction with said second surface, wherein said third surface is generally parallel to said flattening surface.

6. An ultrasonic welding assembly comprising a horn and an anvil, wherein said horn comprises a generally T-shaped flattening surface, first and second recesses located on opposite sides of a stem of said T-shaped flattening surface, and first and second bevels, said first bevel being located between said first recess and a first arm of said T-shaped flattening surface and said second bevel being located between said second recess and a second arm of said T-shaped flattening surface.

7. An ultrasonic welding assembly comprising a horn and an anvil, said horn comprising a generally T-shaped flattening surface, and further comprising an anvil cover overlying opposing portions of said anvil and comprising a T-shaped cutout, wherein said T-shaped flattening surface of said horn fits in said T-shaped cutout of said anvil cover.

8. The assembly as recited in claim 7, further comprising structure for aligning said anvil cover with said anvil.

9. The assembly as recited in claim 8, wherein said aligning structure comprises a dowel pin, a first hole in said anvil for receiving a first portion of said dowel pin, and a second hole in said anvil cover for receiving a second portion of said dowel pin.

10. The assembly as recited in claim 7, wherein said anvil comprises a slot and said anvil cover comprises first and second slots, said first slot of said anvil cover overlying a first portion of said slot of said anvil and said second slot of said anvil cover overlying a second portion of said slot of said anvil.

11. The assembly as recited in claim 10, wherein each of said first through third slots has a respective end portion formed by converging surfaces.

12. The assembly as recited in claim 10, wherein each of said first through third slots has a respective mid-portion formed in part by a beveled surface.

13. The assembly as recited in claim 7, wherein said anvil cover comprises a passageway having first and second openings, wherein said first opening is located on a side of said anvil cover that faces said flattening surface of said horn and said second opening is in communication with a source of pressurized air.

14. An ultrasonic welding assembly comprising a horn and an anvil, wherein said horn comprises a flattening surface and a first plurality of projections projecting out of said flattening surface, each of said first plurality of projections comprising first and second surfaces that are neither parallel nor perpendicular to said flattening surface, said first and second surfaces being inclined at different angles.

15. The assembly as recited in claim 14, wherein each of said first plurality of projections comprises a third surface having a first junction with said first surface and a second junction with said second surface, wherein said third surface is generally parallel to said flattening surface.

16. The assembly as recited in claim 14, wherein said horn further comprises a rail projecting forward of said flattening surface, said rail being shaped to serve as a dam for flowing thermoplastic material, said first surface facing toward said rail and said second surface facing away from said rail, said first surface having an angle of inclination, relative to said flattening surface, that is less than an angle of inclination of said second surface.

17. The assembly as recited in claim 14, further comprising a second plurality of projections projecting, at least in part, out of said flattening surface, each of said second plurality of projections comprising a first surface that is neither parallel nor perpendicular to said flattening surface, and a second surface that is generally perpendicular to said flattening surface.

18. The assembly as recited in claim 17, wherein said projections of said first plurality each have a trapezoidal profile and said projections of said second plurality each have a triangular profile.

19. The assembly as recited in claim 17, wherein said projections of said first plurality are flanked by said projections of said second plurality.

20. An ultrasonic welding assembly comprising a horn having a flattening surface of predetermined shape, an anvil and an anvil cover overlying opposing portions of said anvil, wherein said anvil cover comprises a cutout and said flattening surface of said horn fits in said cutout.

21. The assembly as recited in claim 20, further comprising structure for aligning said anvil cover with said anvil.

22. The assembly as recited in claim 21, wherein said aligning structure comprises a dowel pin, a first hole in said anvil for receiving a first portion of said dowel pin, and a second hole in said anvil cover for receiving a second portion of said dowel pin.

23. The assembly as recited in claim 20, wherein said anvil comprises a slot and said anvil cover comprises first and second slots, said first slot of said anvil cover overlying a first portion of said slot of said anvil and said second slot of said anvil cover overlying a second portion of said slot of said anvil.

24. The assembly as recited in claim 20, further comprising a heater installed inside said anvil.

25. The assembly as recited in claim 20, wherein said anvil comprises a passageway having first and second openings, wherein said first opening is located on a side of said anvil that faces said flattening surface of said horn and said second opening is in communication with a source of pressurized air.

* * * * *